M. A. DILLEY.
Grain-Drill.
No. 38,733.  Patented June 2, 1863.
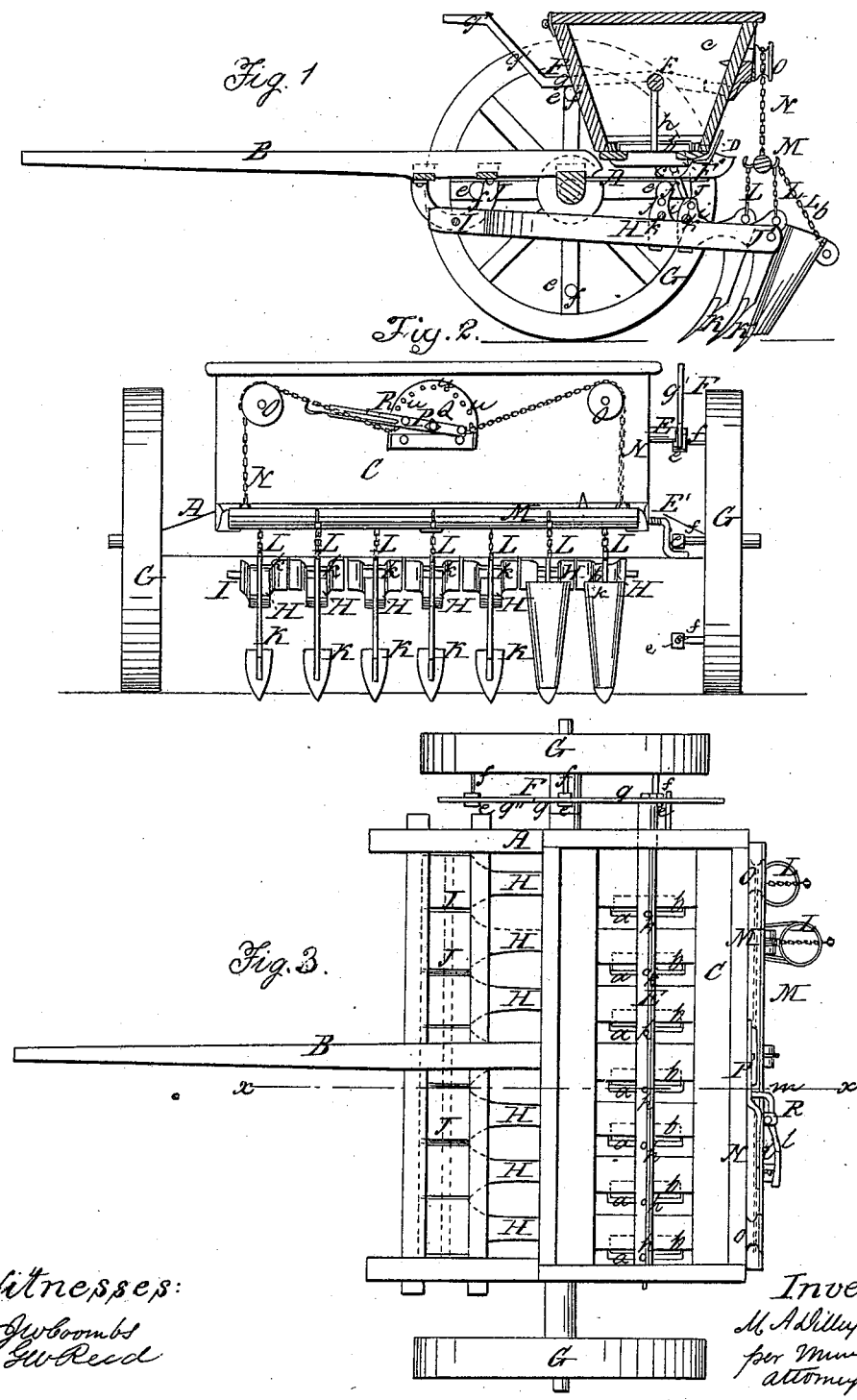

UNITED STATES PATENT OFFICE.

MARTIN A. DILLEY, OF MENDON, MICHIGAN.

IMPROVEMENT IN GRAIN-DRILLS.

Specification forming part of Letters Patent No. 38,733, dated June 2, 1863.

*To all whom it may concern:*

Be it known that I, M. A. DILLEY, of Mendon, in the county of St. Joseph and State of Michigan, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $x\,x$, Fig. 3; Fig. 2, a back view of the same; Fig. 3, a plan or top view of the same.

Similar letters of reference indicate corresponding parts in the several figures.

This invention relates to an improved seeding-machine of that class which is designed for sowing seed broadcast or in close drills, and which is provided with seed-coverers arranged in such a manner as to cover the seed perfectly and to serve also the office of cultivators when desired.

To enable those skilled in the art to fully understand and construct my invention, I will proceed to describe it.

A represents a rectangular horizontal frame, which has a draft-pole, B, attached centrally to it. On the back part of this frame A there is placed a seed box or hopper, C, which extends the whole width of the frame A, as shown in Figs. 2 and 3. The bottom of the seed-box C has a series of slots, $a$, made transversely in it at equal distances apart, as shown in Fig. 3, and to the under side of the bottom of the seed-box there is attached a sliding frame, D, which has a series of cross-plates, $b$, attached to it, the plates $b$ being parallel with the slots $a$ in the bottom of the seed-box. The frame D slides or moves in a direction longitudinally with the seed-box, and said frame may be operated or adjusted by means of a screw, E′, having its bearing in one side of the frame A and working in a nut, $c$, attached to the frame D. By thus adjusting the frame D the plates $b$ of the latter may be made to extend more or less under the slots $a$ in the bottom of the seed-box and therefore regulate the capacity of the slots or close them entirely, as may be required.

By regulating the capacity of the slots $a$ a greater or less quantity of seed may be sown on a given area, as required, as the seed is discharged from the seed-box through the slots $a$. The frame D is fitted in suitable guides, $d$, attached to the under side of the seed-box C.

Within the seed-box C there is placed longitudinally a shaft, E, which extends the whole length of the seed-box and projects through one end of it. On this projecting end of the shaft E there is fitted a bent arm, F, the shape of which is clearly shown in Fig. 1. It will be seen by referring to this figure that the arm is of zigzag form, and by referring to Fig. 2 it will be seen that said arm is directly over friction-rollers $e$, which are on pins $f$, which project horizontally at equal distances apart from the inner side of one of the wheels G. The part $g$ of the arm F is acted upon by the rollers $e$ as the wheel G rotates and the other parts, $g'\,n''$, of the arm in front of $g$ admit of the arms falling as each roller leaves the part $g$, said parts resting on the rollers consecutively as they leave the part $g$ of the arm. By this means the arm will be properly supported or prevented from falling beyond a certain distance.

To the shaft E there are attached a series of arms, $h$, which are of sufficient length to extend down into the slots $a$. These arms $h$, which may be made of stiff wire, are moved in the slots $a$ under the rocking motion of the shaft E, which is communicated to it by the arm F, actuated by the rollers $e$ on the pins $f$ of wheel G. The arms $h$ keep the slots $a$ always open or unobstructed, so as to insure a proper discharge of the seed.

H represents a series of wooden beams, the front ends of which are fitted loosely on a shaft, I, which is placed in semicircular pendants J at the front part of the frame A. These pendants J are placed at such a distance apart as to admit of two beams H being fitted between them, and they effectually prevent the beams binding against each other. The beams are allowed to work freely on the shaft I, and to their back ends there are attached teeth K, which may be of the usual shovel or cultivator form. The upper ends of the teeth are each provided with a plate, $i$, and these plates are fitted in slots in the beams and secured therein by pivots $j$, on which they may turn when not held in position by wooden pins $k$, which pass through the plates above the beams, and may be fitted in any of a number of holes in said plates. These wooden pins, in case of the teeth coming in contact with any obstruction in the earth, will break and admit of the teeth turning backward, so as to pass over the obstruction.

The teeth K have each a chain, L, attached to their upper ends, and these chains are connected to a bar, M, the ends of which have chains N N attached to it. These chains N N pass over pulleys O O at the back of the seed-box C, and are connected to a bar, P, which is pivoted to a semicircular plate, Q, at a point midway between the points where the chains N N are connected to it.

The bar P has a spring-catch, R, attached to it. This catch is formed of a lever, $l$, which is pivoted to the bar P, having a spring, $l^\times$, acting against it, and is curved or bent at its inner end to form a pin, $m$, which passes through the bar P at right angles and into any of a series of holes $u$, arranged in semicircular form in the plates Q, near its edge. (See Fig. 2.) By adjusting this bar P the chains N N will be actuated, and the bar M, and consequently the teeth K, raised or lowered.

The teeth may be retained at any desired point by means of the catch R, and each tooth is rendered capable of an independent adjustment—that is to say, may rise and fall to a certain extent—to conform to the irregularities of the surface of the ground.

I would remark that any proper or desired form of teeth may be applied to the beams H, seed-tubes being used, as shown at S, when the seed is to be sown in drills, the usual conducting-tubes being employed for conveying the seed to the tubes of the teeth.

Having thus described my invention, what I claim as new, and desire to secure by Letters Patent, is—

The manner of adjusting—that is to say, raising and lowering—the teeth K, to wit, by means of the bar M, having the teeth connected to it by chains L, and the bar connected at its ends by chains N N to a bar, P, pivoted to a semicircular plate, Q, provided with holes $u$, the bar P having a catch, R, attached to it, and all arranged as and for the purpose herein set forth.

MARTIN A. DILLEY.

Witnesses:
R. M. HAZARD,
EDWARD S. CHASE.